US012125091B2

(12) United States Patent
Abeer et al.

(10) Patent No.: US 12,125,091 B2
(45) Date of Patent: Oct. 22, 2024

(54) SEARCH RESULT RANKING ACCORDING TO INVENTORY INFORMATION

(71) Applicant: Home Depot Product Authority, LLC, Atlanta, GA (US)

(72) Inventors: Muhammad Abeer, Alpharetta, GA (US); Bhavin Vithalani, Smyrna, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 18/528,205

(22) Filed: Dec. 4, 2023

(65) Prior Publication Data

US 2024/0112235 A1    Apr. 4, 2024

Related U.S. Application Data

(63) Continuation of application No. 17/957,119, filed on Sep. 30, 2022, now Pat. No. 11,869,058, which is a
(Continued)

(51) Int. Cl.
*G06Q 30/00* (2023.01)
*G06F 16/245* (2019.01)
(Continued)

(52) U.S. Cl.
CPC ... *G06Q 30/0625* (2013.01); *G06F 16/24569* (2019.01); *G06F 16/24578* (2019.01); *G06F 16/9535* (2019.01); *G06F 16/9538* (2019.01)

(58) Field of Classification Search
CPC .................................................. G06Q 30/0625
See application file for complete search history.

(56) References Cited

U.S. PATENT DOCUMENTS 9,064,277 B2  6/2015 Wong
9,245,271 B1  1/2016 Ahmed
(Continued)

FOREIGN PATENT DOCUMENTS

CA    2712789 C    7/2017

OTHER PUBLICATIONS

Wang, Haishuai, et al. "Fulfillment-Time-Aware Personalized Ranking for On-Demand Food Recommendation." Proceedings of the 30th ACM International Conference on Information & Knowledge Management. 2021.*
(Continued)

*Primary Examiner* — Kathleen Palavecino
(74) *Attorney, Agent, or Firm* — Greenberg Traurig, LLP

(57) ABSTRACT

A method for returning a results page responsive to a user search query, such as a search query on a website, may include receiving a search query from a user, determining, responsive to the query, a set of relevant products from a plurality of product listings based on a similarity of the user query to the respective product listings, retrieving inventory information respective of each of the relevant products, the inventory information comprising one or more available fulfillment channels respective of each of the relevant products, ranking the relevant products with respect to each other according to the inventory information, and returning, to the user, a search result comprising a list of the relevant products, ordered according to the ranking.

20 Claims, 5 Drawing Sheets

Related U.S. Application Data continuation of application No. 16/584,447, filed on Sep. 26, 2019, now Pat. No. 11,514,499.

(51) Int. Cl.
*G06F 16/2457* (2019.01)
*G06F 16/9535* (2019.01)
*G06F 16/9538* (2019.01)
*G06Q 30/0601* (2023.01)

(56) References Cited

U.S. PATENT DOCUMENTS

| | | |
|---|---|---|
| 9,898,772 B1 | 2/2018 | Word |
| 10,223,648 B2 | 3/2019 | Tseng |
| 2009/0138371 A1 | 5/2009 | McGee |
| 2010/0225045 A1 | 9/2010 | Kimura |
| 2011/0173028 A1 | 7/2011 | Bond |
| 2016/0225045 A1 | 8/2016 | Cumberland |
| 2017/0330262 A1 | 11/2017 | Jadhav |
| 2017/0372394 A1 | 12/2017 | Jones |
| 2019/0180231 A1 | 6/2019 | Phillips |
| 2021/0089545 A1 | 3/2021 | Suslov |

OTHER PUBLICATIONS

ISA/US, International Search Report and Written Opinion issued in PCT2020/050700, dated Dec. 15, 2020, 10 pgs.
Wilson, Jeremy S., "Combining search techniques and stand visualization to explore and analyze forest inventory databases." In: Computers and electronics in agriculture, Feb. 6, 2004, 6 pgs.

\* cited by examiner

SEARCH RESULT RANKING ACCORDING TO INVENTORY INFORMATION

CROSS-REFERENCE TO RELATED APPLICATION

This application is a Continuation of U.S. patent application Ser. No. 17/957,119, entitled "SEARCH RESULT RANKING ACCORDING TO INVENTORY INFORMATION," filed Sep. 30, 2022, which is hereby incorporated by reference in its entirety.

FIELD OF THE DISCLOSURE

The instant disclosure relates to responding to internet-based user queries, including results of user searches on an e-commerce platform, for example.

BACKGROUND

Online e-commerce platforms (accessible through web sites, applications, and the like) typically offer product searching or browsing features, in which one or more products are displayed on a web page. Each product listing is often shown with an image, name, price, and/or availability of the product. An e-commerce platform may be associated with one or more brick-and-mortar stores, and the platform may provide an indication as to whether one or more products are available in a particular brick-and-mortar store (i.e., "in stock" or "out of stock"). A user may submit a query to the platform and receive, in return, a list of available products (e.g., products that are "in-stock").

SUMMARY

An embodiment of a computer-implemented method for returning a results page responsive to a user search query includes receiving a search query from a user, determining, responsive to the query, a set of relevant products from a plurality of product listings based on a similarity of the user query to the respective product listings, retrieving inventory information respective of each of the relevant products, the inventory information comprising one or more available fulfillment channels respective of each of the relevant products, ranking the relevant products with respect to each other according to the inventory information, and returning, to the user, a search result comprising a list of the relevant products, ordered according to the ranking.

In an embodiment, ranking the relevant products comprises calculating a respective fulfillment score for each of the relevant products, scaling a respective relevance score of each of the relevant products by the respective fulfillment scores, and ranking the relevant products according to the scaled relevance scores.

In an embodiment, calculating the respective fulfillment score for each of the relevant products comprises, for each relevant product: assigning a respective value to each of the one or more available fulfillment channels associated with the relevant product, and combining the respective values, the combined values comprising the fulfillment score.

In an embodiment, ranking the relevant products comprises calculating a respective fulfillment score for each of the relevant products, and ranking the relevant products according to the fulfillment scores.

In an embodiment, calculating the respective fulfillment score for each of the relevant products comprises, for each relevant product: assigning a respective value to each of the one or more available fulfillment channels associated with the relevant product, and combining the respective values, the combined values comprising the fulfillment score.

In an embodiment, the one or more fulfillment channels respective of the relevant products comprise in-store pickup, ship to store, deliver from store, ship to home, and unavailable.

In an embodiment, ranking the relevant products comprises determining a location of the user at the time of the search query, and ranking the relevant products according to respective inventories of the relevant products near the location.

In an embodiment, ranking the relevant products comprises determining, according to an stored information associated with the user, a preferred fulfillment channel associated with the user, and ranking the relevant products according to respective inventories of the relevant products for the preferred fulfillment channel.

In an embodiment, ranking the relevant products comprises determining an electronic device type from which the search query was received, assigning values to one or more fulfillment channels associated with the relevant products according to the electronic device type, and ranking the relevant products according to the assigned values.

An embodiment of a system for returning a results page responsive to a user search query includes a processor and a non-transitory, computer-readable memory storing instructions that, when executed by the processor, cause the processor to perform a method that includes receiving a search query from a user, determining, responsive to the query, a set of relevant products from a plurality of product listings based on a similarity of the user query to the respective product listings, retrieving inventory information respective of each of the relevant products, the inventory information comprising one or more available fulfillment channels respective of each of the relevant products, ranking the relevant products with respect to each other according to the inventory information, and returning, to the user, a search result comprising a list of the relevant products, ordered according to the ranking.

In an embodiment, ranking the relevant products comprises calculating a respective fulfillment score for each of the relevant products, scaling a respective relevance score of each of the relevant products by the respective fulfillment scores, and ranking the relevant products according to the scaled relevance scores.

In an embodiment, calculating the respective fulfillment score for each of the relevant products comprises, for each relevant product: assigning a respective value to each of the one or more available fulfillment channels associated with the relevant product, and combining the respective values, the combined values comprising the fulfillment score.

In an embodiment, ranking the relevant products comprises calculating a respective fulfillment score for each of the relevant products, and ranking the relevant products according to the fulfillment scores.

In an embodiment, calculating the respective fulfillment score for each of the relevant products comprises, for each relevant product: assigning a respective value to each of the one or more available fulfillment channels associated with the relevant product, and combining the respective values, the combined values comprising the fulfillment score.

In an embodiment, the one or more fulfillment channels respective of the relevant products comprise in-store pickup, ship to store, deliver from store, ship to home, and unavailable.

In an embodiment, ranking the relevant products comprises determining a location of the user at the time of the search query, and ranking the relevant products according to respective inventories of the relevant products near the location.

In an embodiment, ranking the relevant products comprises determining, according to an stored information associated with the user, a preferred fulfillment channel associated with the user, and ranking the relevant products according to respective inventories of the relevant products for the preferred fulfillment channel.

In an embodiment, ranking the relevant products comprises determining an electronic device type from which the search query was received, assigning values to one or more fulfillment channels associated with the relevant products according to the electronic device type, and ranking the relevant products according to the assigned values.

An embodiment of a server-implemented method for returning a results page responsive to a user query includes executing a search of a plurality of product listings responsive to a user query, determining, based on the search, a set of relevant products from the plurality of product listings based on a similarity of the user query to the respective product listings, retrieving inventory information respective of each of the relevant products, the inventory information comprising one or more available fulfillment channels respective of each of the relevant products, ranking the relevant products with respect to each other according to the inventory information, and returning, to the user, a search result comprising a list of the relevant products, ordered according to the ranking.

In an embodiment, ranking the relevant products comprises calculating a respective fulfillment score for each of the relevant products, and (i) scaling a respective relevance score of each of the relevant products by the respective fulfillment scores and ranking the relevant products according to the scaled relevance scores or (ii) ranking the relevant products according to the fulfillment scores.

DETAILED DESCRIPTION

Although known e-commerce platforms may display lists of available products, the availability of such products in different order fulfillment channels may not be sufficiently factored into the ordering of results to a query (e.g., search results). As a result, known platforms may not provide the most significant results to the user.

An example e-commerce platform may include one or more frontend systems (e.g., for generating web pages in a web browser and/or user interfaces in an application) that communicate with one or more backend systems (e.g., servers or other data sources from which user interfaces are generated, search engines, and other processing) that collectively provide a website, application, or other electronic platform that presents a merchant's product offerings to users and enables users to shop or browse those product offerings. The backend systems may include some combination of databases, relationships, and logic to provide information about the products to the frontend systems for display to the user.

An example backend system may store information about products in a catalog offered by a merchant or retailer. Product information may include a name, brand, price, specifications, product number (such a manufacturer number and/or a merchant-specific number), an image or images of the product, and/or other information. Such a product catalog backend system may be queried in order to generate web pages on the e-commerce platform, such as a product search result web page—which may include information respective of numerous products and/or product types that are responsive to a user search on the platform—or a product information web page, which may include information respective of a single product, among other possible web pages. Such an e-commerce platform will be discussed as an example implementation of the novel user query response methodology of the instant disclosure, but numerous other implementations are possible and contemplated.

Figure 1:
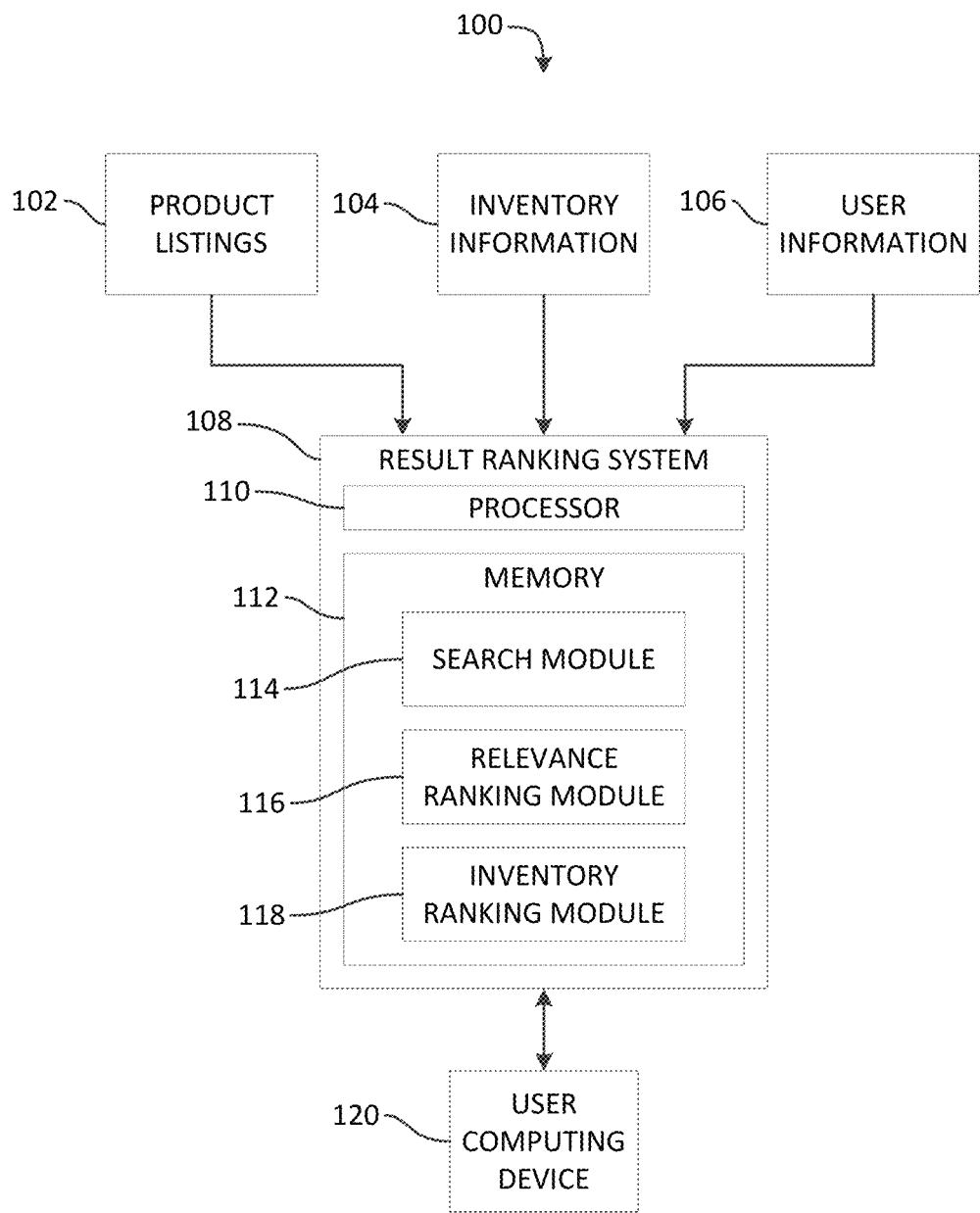
FIG. 1 is a block diagram illustrating an example system for returning a results page responsive to a user query.

Referring to the drawings, wherein like numerals refer to the same or similar features in the various views, FIG. 1 is a block diagram illustrating an example system 100 for returning a results page responsive to a user query.

The system 100 may include an electronic repository of product listings 102, an electronic repository of product inventory information 104, an electronic repository of user information 106, and a result ranking system 108. The result ranking system 108 may include a processor 110 and a non-transitory, computer-readable memory 112 storing instructions that, when executed by the processor 110, cause the processor 110 to perform one or more steps, methods, algorithms, or other functionality of this disclosure. The instructions in the memory 112 may include one or more functional modules 114, 116, 118, including a search module 114, a relevance ranking module 116, and an inventory ranking module 118. The repository of product listings 102, repository of product inventory information 104, and repository of user information 106 may each be embodied in one or more non-transitory computer-readable memories, such as one or more databases, for example.

The product listings 102 may include, in some embodiments, information respective of a plurality of products, such as a plurality of products offered by sale by a retailer. Such products may be offered for sale through online sales and/or sales in brick-and-mortar stores. Information respective of each product may include a product classification, (e.g., by category and one or more sub-categories), a product name, product brand, textual product description, one or more product features or functions, one or more images or videos associated with the product, and/or other information. The product listings 102 may comprise, in embodiments, one or more product information pages respective of each product, where each product information page is displayable to a user on an e-commerce website when the user selects the associated product. Accordingly, the product listings 102 may include product information that is used as source data for populating an e-commerce website, in some embodiments.

The inventory information 104 may include inventory information for some or all of the products having information in the repository of product listings 102. The inventory information 104 may include inventory quantities in one or more brick-and-mortar stores, inventory quantities available for online purchase by consumers, and/or warehoused or other inventory available for distribution. The inventory information 104 may include fulfillment channel information respective of each product (and inventory quantities for each fulfillment channel), in some embodiments—i.e., one or more channels through which fulfillment of an order for each product is available. The fulfillment channels reflected in the inventory information 104 may include one or more of in-store pickup (in which a product is in inventory in a store, and the user can purchase the item remotely (e.g., through a website) and pick the product up in the store), ship to store (in which a product is in inventory in a location remote from a store (e.g., a warehouse or another store) and the user can purchase the product, the product is shipped to the user's selected store, and the user picks the product up from the selected store), deliver from store (in which a product is in inventory in a store, and is shipped from the store to the user's home or other selected address), ship to home (in which a product is available in a warehouse for delivery to the user's home or other selected address), and/or unavailable, in an embodiment. For a given store, the stock quantity for a given product may be indicative of its availability for purchase (e.g., "in stock" or "available," "limited stock," "out of stock" or "unavailable," etc.), and/or the quantity of the product that is available for purchase in the store. The inventory information 104 may be stored in or obtained from a master inventory database of a retailer, in an embodiment, which master inventory database may be used (e.g., by the e-commerce website and/or one or more brick-and-mortar store order systems) as ground truth for the retailer regarding availability of each product for order.

The user information 106 may include information respective of one or more users of an e-commerce website, mobile application, or other interface with which the result ranking system 108 is associated. The user information 106 may include, for example, respective user profile information provided explicitly by one or more users. Such user profile information may include, for example, a user's stated fulfillment channel preferences (e.g., a user-selected preference for one or more fulfillment channels over others), an anchor store selected by the user, the user's purchase history, and/or a user type associated with the user (e.g., a "pro" user or a "DIY" user). The user profile information may also include a user's base location (e.g., the user's home address, preferred shipping address, and/or ZIP code, or other static location information associated with the user), a user's preferred brick-and-mortar store location (e.g. from among a plurality of locations associated with a retailer), and/or other location information.

The result ranking system 108 may be in electronic communication with one or more user computing devices 120. The result ranking system 108 may receive queries (e.g., search queries) from the user computing devices 120 and return ordered lists of items (e.g., products) responsive to the requests. The lists of products responsive to a query may be ordered according to the relevance of each product to the query and/or according to inventory information respective of each product. In some embodiments, the result ranking system 108 may be integrated into a system that hosts an e-commerce website, such as a website of a retailer. The remainder of this disclosure will be described with reference to such an embodiment, but such description is by way of example only. The result ranking system 108 may be implemented as part of a search engine or similar functionality that is configured to search the product listings 102 to provide product lists, and information respective of the products on the product lists, to the user computing devices 120.

As will be described in greater detail with respect to FIGS. 2-5, the result ranking system 108 may be generally configured to determine a ranked order for a set of results to provide to a user, such as a set of products responsive to a user search query. The result ranking system 108 may be configured to determine the ranked order according to the inventory information 104, the user information 106, and/or product information in the product listings 102. In particular, the result ranking system 108 may be configured to determine the ranked order according to inventory of relevant products in one or more fulfillment channels, based on the desirability of those fulfillment channels to the particular user.

The search module 114 may be configured to search the product listings 102 based on a user query to determine products responsive to the user query and designate such products as responsive, for further analysis or processing by the relevance ranking module 116 and/or the inventory ranking module 118. Searching the product listings may include, in embodiments, comparing the user query to information respective of each product to determine a similarity between the user query and the product information. For example, where the user query is a user selection of a product category, searching product listings may include comparing predetermined product category information stored in the product information with the user-selected product category. In an embodiment in which the user query is a text search query, searching product listings may include comparing information respective of each of the products to the text of the search query to determine which products are most similar to the text of the search query.

The relevance ranking module 116 may be configured to rank the responsive products based on the relevance of the products to the user query and/or on inventory information. The relevance ranking module 116 may rank responsive products with respect to one another. The relevance ranking module may be configured to calculate such rankings according to, for example, the relative closeness of fit of the product information respective of each product to the user query.

The inventory ranking module 118 may be configured to rank responsive products with respect to one another based on the inventory information respective of the products, including the availability of each of the products in one or more fulfillment channels, such as by ranking the relevant products according to the desirability of the one or more available fulfillment channels respective of each of those products relative to one another. Factors that may be considered in ranking products according to inventory information, and examples of ranking products according to inventory information, are described in detail below.

In embodiments, the fulfillment channels in the inventory information 104 may be considered in conjunction with the user information 106 when ranking products. For example, when a product is available in an in-store pickup fulfillment channel, diminishing weight may be assigned to the fulfillment channel as the store for which in-store pickup is available increases in distance from the user's location or from a preferred store of the user. That is, the value of the pickup in store fulfillment channel may be inversely proportional to the distance between the store with availability and the user's location. In a further example, certain products, or product types may be ranked according to whether a user is a "pro" user or a "DIY" user. Still further, different delivery channels may be weighed differently for a "pro" user than for a "DIY" user. For example, higher weights may be assigned to "buy online and pick up in store" and "buy online deliver from store" delivery channels for a "pro" user than for a "DIY" user, in some embodiments.

In another example, if a ship-to-store fulfillment channel is available, the weight of the channel may be associated with shipping time (e.g., such that two-day shipping has a higher value than one-week shipping). In another example, if a ship to home or buy online and deliver from store fulfillment channel is available, the value of the fulfillment channel may be inversely proportional to shipping time. Similarly, and online-only fulfillment channel shipping time may be a factor in the value of the channel.

As noted above, the inventory ranking module 118 may leverage static user location data, such as data stored in the user information. In some embodiments, the inventory ranking module 118 may also utilize dynamic user location data, such as data obtained from a user computing device 120. Such data may be, for example, an address, ZIP code, or GPS coordinates of the user's current location, or other information indicative of the user's current location, such as an IP address of the user computing device. Such dynamic information may be received, via a server or other computing device providing an electronic interface to the user computing device 120, along with a user query or otherwise in connection with the user's interaction with the interface.

The user computing devices 120 may be, in embodiments, personal computers, mobile computing devices, and the like. The user computing devices may be operated by users of the website or other interface with which the result ranking system is associated. The user computing devices may be configured to provide location information to the result ranking system 108, in some embodiments.

Figure 2:
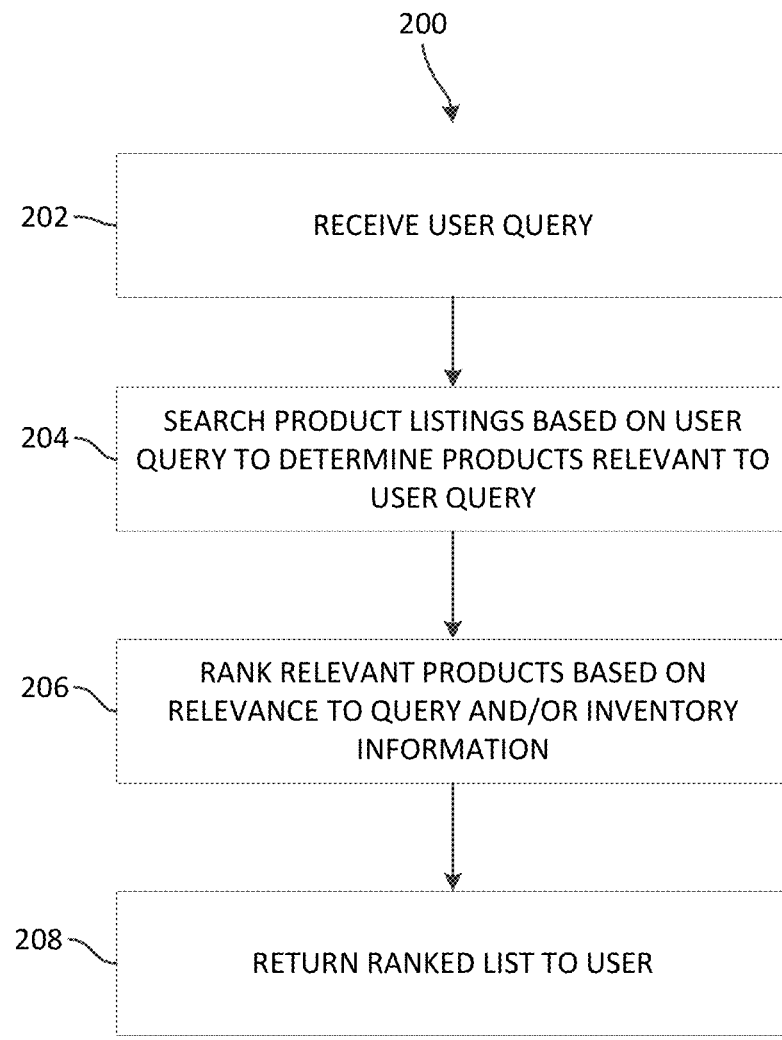
FIG. 2 is a flow chart illustrating an example method of returning a results page responsive to a user query.

FIG. 2 is a flow chart illustrating an example method 200 of returning a results page responsive to a user query. The method 200, or one or more portions thereof, may be performed by the result ranking system 108 of FIG. 1, in some embodiments.

The method 200 may include a step 202 that includes receiving a user query. The user query may be received from a user computing device through a computer-based interface, in embodiments. For example, the user query may be received through an e-commerce website or e-commerce application for a mobile computing device. The user query may be, for example, a selection of a product category, product type, product feature, product function, or other interface element offered for user selection on the interface. The user query may also be a search query, such as a text search query entered in a search bar of the interface, for example. In some embodiments, the user query may include a combination of a text search query and a user selection of one or more categories, features, or other interface-provided selections.

The method 200 may further include a step 204 that includes searching product listings based on the received user query to determine products relevant to the user query. Searching the product listings may include, in embodiments, comparing the user query to information respective of each product to determine a similarity between the user query and the product information. For example, where the user query is a user selection of a product category, searching product listings may include comparing predetermined product category information stored in the product information with the user-selected product category and designate products as relevant when the product category matches the user-selected category. In an embodiment in which the user query is a text search query, searching product listings may include comparing information respective of each of the products to the text of the search query to determine which products are most similar to the text of the search query.

The method 200 may further include a step 206 that includes ranking the relevant products based on the relevance of the products to the user query and/or based on inventory information. An example of step 206 will be described in detail with respect to FIG. 3. In brief, step 206 may include ranking the relevant products determined to be relevant to the query in step 204 with respect to one another. The ranking may account for the inventory information respective of each of the relevant products, including the availability of each of the relevant products in one or more fulfillment channels, such as by ranking the relevant products according to the desirability of the one or more available fulfillment channels respective of each of those products relative to one another. The ranking may also account for the relevance of the relevant products (e.g., where such relevance is expressed on a multiple-value scale, as opposed to a binary relevant/irrelevant determination) by also accounting for the relative relevance of each relevant product in ranking the products.

Figure 4:
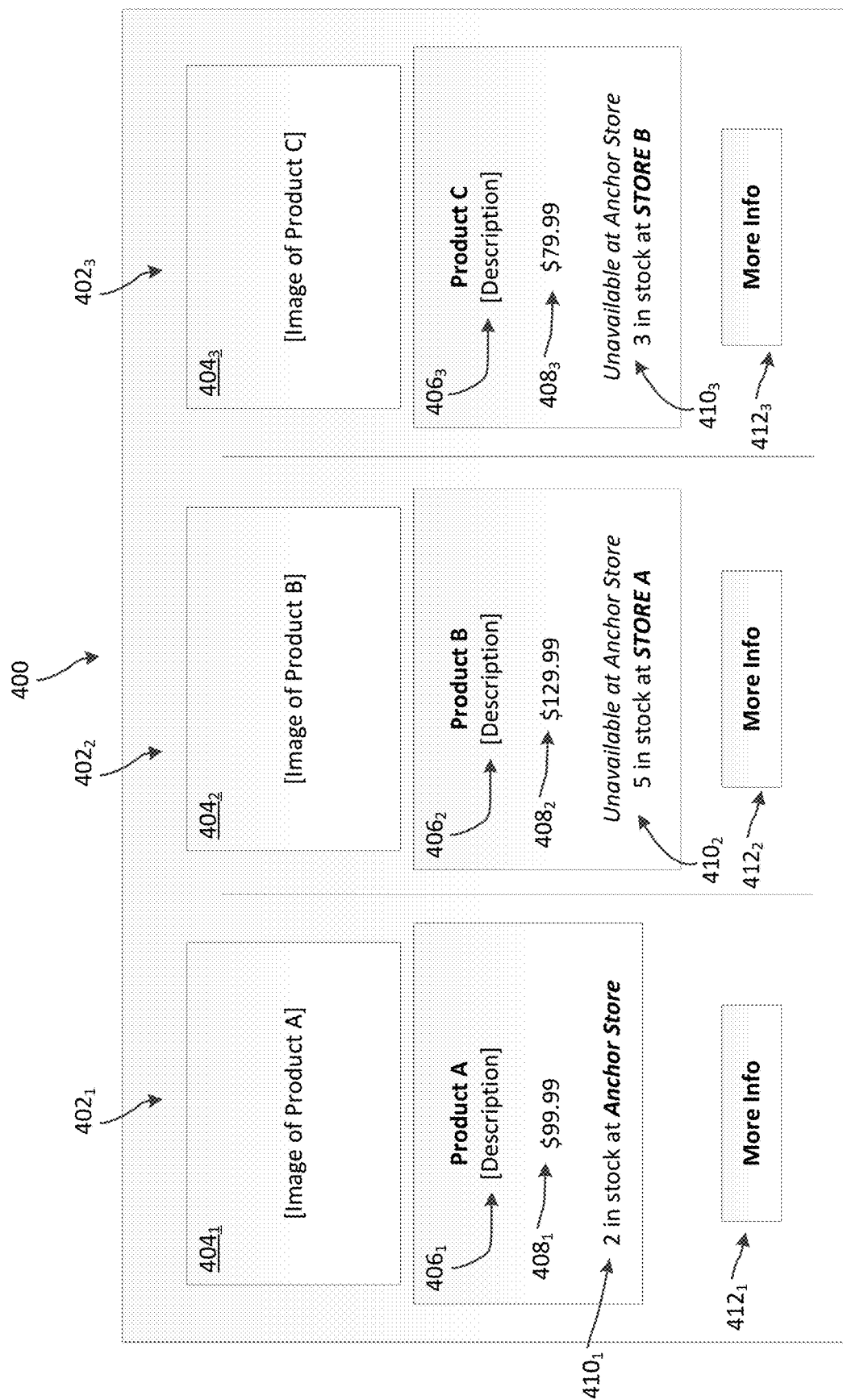
FIG. 4 is an example result page responsive to a user query.

The method 200 may further include a step 208 that includes returning the ranked list to the user. Returning the ranking list to the user may include, for example, transmitting a result web page or other interface portion to the user computing device, or causing such a page or interface portion to be transmitted. For example, FIG. 4 is a diagram of an example result page 400 responsive to a user query. The example result page 400 includes product information $402_1$, $402_2$, $402_3$ respective of three products, namely, Product A, Product B, and Product C. The product information 402 respective of each product may include, in some embodiments, an image 404, a description 406, a price 408, and inventory information 410. The inventory information may include inventory respective at a product at one or more stores (e.g., the user's anchor store and/or other nearby stores). The result page 400 may also include respective hyperlinked interface elements 412 that a user may select to navigate to a product information page respective of the product that includes more information about the product.

Figure 3:
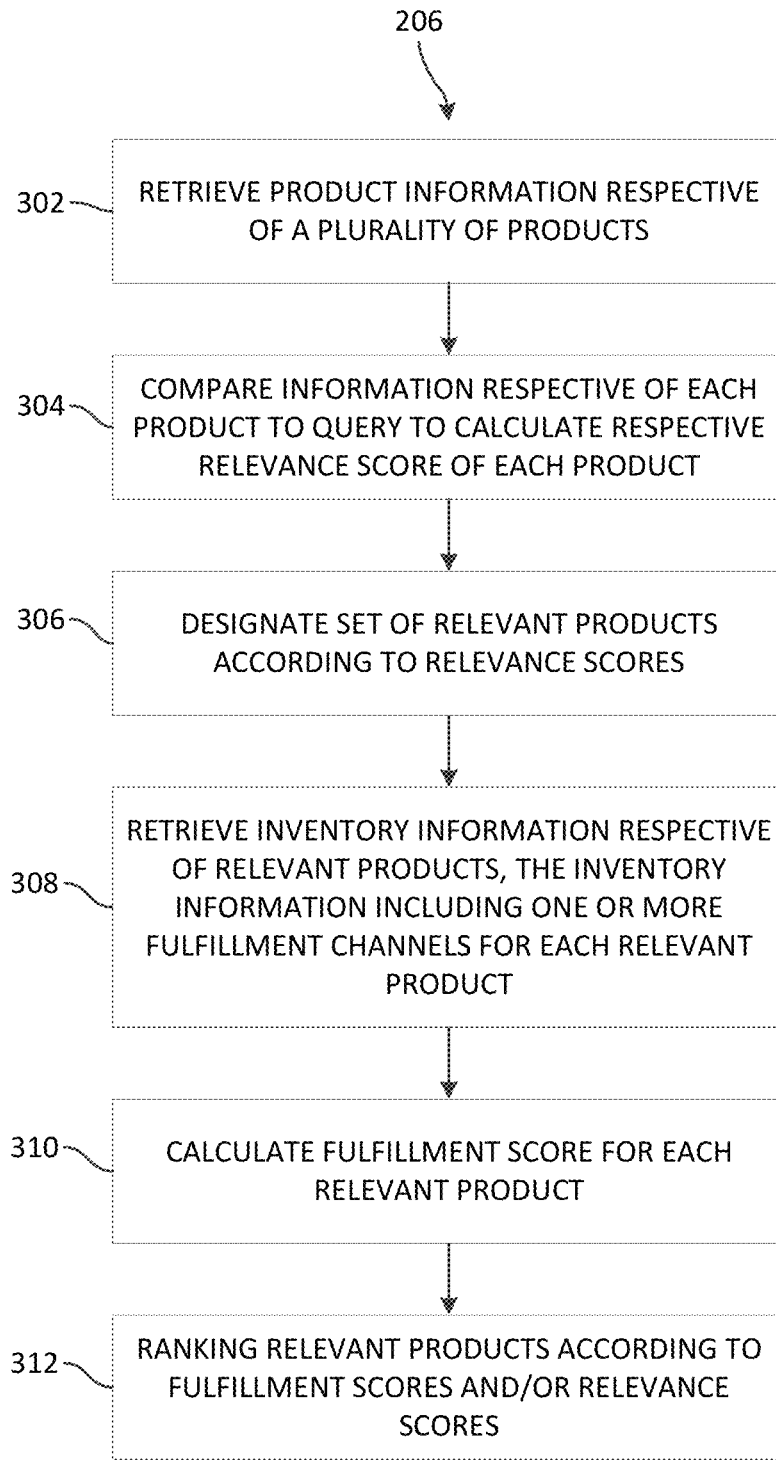
FIG. 3 is a flow chart illustrating an example method of ranking a plurality of products according to respective relevance and/or inventory of the products.

FIG. 3 is a flow chart illustrating an example method 206 of ranking a plurality of products according to a relevance and/or inventory. The method 206 of FIG. 3 may be performed in response to a user query, after a repository of product information has been searched to find products responsive to the query. The method 206 of FIG. 3 is one example embodiment of step 206 of the method 200.

The method 206 may include a step 302 that includes retrieving product information respective of a plurality of products (e.g., a plurality of products that are responsive to a user query, as noted above). The product information may include, for example, a product classification, product name, product brand, textual product description, one or more product features or functions, and/or one or more images or videos associated with the product.

The method 206 may further include a step 304 that includes comparing information respective of each product to the user query to calculate a respective relevance score of each product. The relevance score for a given product may be calculated based on a degree of similarity of the product information to the user query. The degree of similarity may be calculated based on, for example, the degree of similarity of the text of the user search query to the textual content associated with the product (e.g., product name, brand, description, etc.). The degree of similarity may further be calculated based on a match (or lack thereof) between a classification, function, or feature of the product and a classification, function, or feature included in the user query. The relevance score may be expressed as a value within a range (e.g., 0-100), rather than as a binary relevant/irrelevant indication.

Determining a degree of similarity of product information to a user query may include determining one or more of: user intent (i.e., searching for products, searching for services, searching for educational information, etc.); a type of product, service, content, etc. included in or described in the query, if any; attributes of a product, service, content, etc. included in or described in the query; and similarity of the query to products, services, content, etc. previously viewed or purchased by the user. Determining a degree of similarity may include applying a hierarchical set of filters according to the above (e.g., first determining user intent, then type, then attributes, etc.), in some embodiments. Additionally or alternatively, determining a degree of similarity may include applying a set of filters in parallel and concatenating or otherwise combining the results of the filters.

In addition to the relevance score of a given product, a user type associated with the source of the user query may be a factor in the determination of relevant products. Alternatively, a user type may be a factor in determining a relevance score of one or more products. For example, certain products or product quantities that are known to be appropriate for, or that are more popular with (e.g., according to purchase data) professional users than with DIY users may have a higher relevance score for professional user types than for "DIY" user types (e.g., a tool that requires specific training to use may be ranked more highly for a professional user type than for a DIY user type). Conversely, certain products or product quantities that are known to be appropriate for, or that are more popular with (e.g., according to purchase data) DIY users than with professional users may have a higher relevance score for DIY user types than for professional user types (e.g., a product that a professional user type would typically purchase in large quantities may be ranked more highly for a DIY user type than for a professional user type if the available inventory is relatively low).

The method 206 may further include a step 306 that includes designating a set of relevant products according to the relevance scores. In an embodiment, a predetermined quantity of the products having the highest relevance scores may be designated as relevant products (e.g., the ten, twenty, or fifty most relevant products). In another embodiment, all products having a relevance score over a predetermined threshold may be designated as relevant products. The relevant products may then be further ranked according to inventories of the relevant products, as will be described below.

The method 206 may further include a step 308 that includes retrieving inventory information respective of the relevant products, the inventory information including one or more fulfillment channels for each product. In an embodiment, for each relevant product designated in step 306, inventory information may be retrieved at step 308. The inventory information may include an availability (and, in some embodiments, a quantity of the product's availability) in each of one or more fulfillment channels.

The method 206 may further include a step 310 that includes calculating a fulfillment score for each relevant product. Calculating a fulfillment score may include, in embodiments, assigning a respective value to each of the one or more available fulfillment channels associated with the product, and combining the respective values, the combined values comprising the fulfillment score. The respective values may be combined through addition, for example.

In an embodiment, calculating a fulfillment score respective of a product may include determining a location of the user (e.g., at the time when the user enters the query) and ranking the relevant products according to respective inventories of the relevant products near the location. For example, as will be described below, the distance from the user's location to one or more stores with in-store inventory of the product may be used as a scalar or weight of the fulfillment option.

In some embodiments, calculating a fulfillment score respective of a product may include determining, according to stored information associated with the user, a preferred fulfillment channel associated with the user, and ranking the relevant products according to respective inventories of the relevant products for the preferred fulfillment channel. For example, the user's preferred fulfillment channel may be weighted more heavily than other fulfillment channels, or more heavily than that fulfillment channel would otherwise be weighed.

In some embodiments, calculating a fulfillment score respective of a product may include determining an electronic device type from which the query was received, assigning values to one or more fulfillment channels associated with the relevant products according to the electronic device type, and ranking the relevant products according to the assigned values. For example, particular fulfillment channels may be weighted differently when the user's computing device is a mobile phone (which may indicate that the user is away from the user's home location, and thus in-store pickup may be weighed more heavily than home delivery) than when the user's computing device is a personal computer (which may indicate that the user is at the user's home location, and thus in-home delivery options may be weighed more heavily than in-store pickup options).

In some embodiments, calculating a fulfillment score respective of a product may include product-specific or category-specific weighting of fulfillment channels. Some products may be more conducive to in-person pickup than shipping, such as large-dimensioned construction lumber, oversized or fragile items, and items that are primarily useful due to compatibility with other products (e.g., specialty screws with specific sizes/shapes). For such products, in-person pickup may be weighted more heavily than other fulfillment channel options, such as ship-to-home options, on the basis of the product or product category. In contrast, other products may be substantially equally conducive to in-store pickup and home delivery, such as thermostats, wiring, small home décor, etc. For such products, the product category may not alter or factor into the fulfillment channel weighting.

In an example, the respective relative values associated with different fulfillment channels may be as follows: (1) available for in-store pickup at a store nearest to a given user, or a user's particular preferred store (which may be referred to herein as an "anchor store") may be associated with the highest score; (2) available for in-store pickup at a nearby store (i.e., nearby to the user but not the closest store to the user, or nearby but not the user's anchor store) may be associated with the second-highest score; (3) ship-to-store may be associated with the third-highest score; (4) ship to home or buy online and deliver from store may be associated with the fourth-highest score; (5) online-only (ship to home)

may be associated with the fifth-highest score; and (6) unavailable may be associated with the sixth-highest score (e.g., a score of zero).

The method 206 may further include a step 312 that includes ranking the relevant products according to their respective fulfillment scores and/or relevance scores. In some embodiments, the relevant products may be ranked according only to their fulfillment scores. An example of such a ranking is provided in Table 1 below. In Table 1, each of three products (Product D, Product E, and Product F) is assigned "point" values for each fulfillment channel in which it is available. The point values in Table 1 are by way of example only. In the example illustrated in Table 1, Product D is available for anchor store pickup, in-store pickup at a non-anchor store 5 miles from the user, and ship-to-home with 5-day shipping; Product E is available for in-store pickup at a non-anchor store 10 miles from the user, ship-to-store with next-day shipping, ship-to-home with 2-day shipping, and deliver from store with next day shipping; Product F is available for in-store pickup at a non-anchor store 5 miles from the user and ship-to-store with next-day shipping. In the example illustrated in Table 1, Product D has the highest fulfillment score of the three products, and thus may be presented first in a ranked list of Product D, Product E, and Product F that is returned to the user; Product E has the second-highest fulfillment score and may be presented second, and Product F has the third-highest fulfillment score and may be presented third.

TABLE 1

|  | Product D | Product E | Product F |
|---|---|---|---|
| Anchor Store Pickup | 50 | — | — |
| Nearby Store Pickup | 20 | 15 | 20 |
| Ship-to-Store | — | 12 | 12 |
| Ship-to-Home | 5 | 8 | — |
| Deliver From Store | 10 | 10 | 10 |
| Fulfillment Score | 85 | 45 | 42 |

In other embodiments, a fulfillment score may be mathematically combined with the relevance score, such as by a multiplier or an additive score, to arrive at a ranking of products. Table 2 below illustrates an example of such a ranking Table 2 includes the same products and fulfillment channel information and scores as Table 1, with a relevance score also assigned to each product. In the example of Table 2, the relevance score respective of each product is multiplied by the fulfillment score to arrive at a total score. In the example illustrated in Table 2, Product E has the highest total score of the three products, and thus may be presented first in a ranked list of Product D, Product E, and Product F that is returned to the user; Product D has the second-highest total score and may be presented second, and Product F has the third-highest total score and may be presented third.

TABLE 2

|  | Product D | Product E | Product F |
|---|---|---|---|
| Anchor Store Pickup | 50 | — | — |
| Nearby Store Pickup | 20 | 15 | 20 |
| Ship-to-Store | — | 12 | 12 |
| Ship-to-Home | 5 | 8 | — |
| Deliver From Store | 10 | 10 | 10 |
| Fulfillment Score | 85 | 45 | 42 |
| Relevance Score | 0.50 | 0.98 | 0.8 |
| Total Score | 42.5 | 44.1 | 33.6 |

The method 206 of FIG. 3 is described with respect to embodiments in which ranking products according to relevance and ranking products according to inventory, are separate steps. In some embodiments, ranking products according to relevance and ranking products according to inventory may be performed as part of a single step or procedure, whereby a single score is generated for each product based both on relevance and inventory, and that single score is used to rank the products in the list presented to the user.

As noted above, determining a fulfillment score for a product may include a determination of one or more brick-and-mortar stores in proximity to the user. For example, an anchor store associated with the user may be determined. Determining an anchor store associated with the user may include retrieving a user-selected anchor store from a stored user profile or other stored information associated with the user. The user profile may be associated with the user by virtue of the user having logged in to the website or other interface through which the user query was provided, through a cookie or other file placed on the user's computing device, based on the user's IP address, or through some other method.

In addition to or as an alternative to determining the user's anchor store, one or more stores in physical proximity to the user may be determined based on the user's location. The user's location may be determined based on a static location associated with the user, such as a user-provided home or preferred shipping address, ZIP code, or anchor store location. The user's location may additionally or alternatively be determined based on dynamic information provided by or in connection with the user's computing device, such as an IP address, GPS coordinates (or location information derived therefrom), an address associated with a network accessed by the user (e.g., a WiFi network), and the like.

In some embodiments, the stores considered as eligible fulfillment channels for a user query may be limited to a certain distance from the user's location (e.g., a static or dynamic location associated with the user). The distance may be determined based on a density of the user's location, in some embodiments. For example, if the user's location is in an urban area, the distance from the user within which stores will be considered as relevant fulfillment channels may be relatively small (e.g., 10 miles). In contrast, if the user's location is in a rural area, the distance from the user within which stores will be considered as relevant fulfillment channels may be relatively large (e.g., 100 miles). Additionally or alternatively, the stores considered as eligible fulfillment channels may be limited by geography or topography of the user's location. For example, if the user's location is on an island, eligible store-based fulfillment channels may be limited to stores on the same island. In another example, if a user's location is on a side of a mountain range, eligible store-based fulfillment channels may be limited to stores on the same side of the mountain range.

In other embodiments, the stores considered as eligible fulfillment channels for a user query may be limited to a predetermined quantity of stores. For example, the five (5), ten (10), fifteen (15), or twenty (20) stores closest to the user's location may be considered eligible fulfillment channels.

In some embodiments, calculating a fulfillment score respective of a product may include consideration of a user's purchase history. For example, if the user's purchase history indicates that the user places a majority of the user's purchases through a given fulfillment channel, that fulfillment channel may be weighted more heavily. In some embodiments, the fulfillment channels may be weighted according to the relative frequency with which the user has used each available fulfillment channel according to the user's purchase history.

Figure 5:
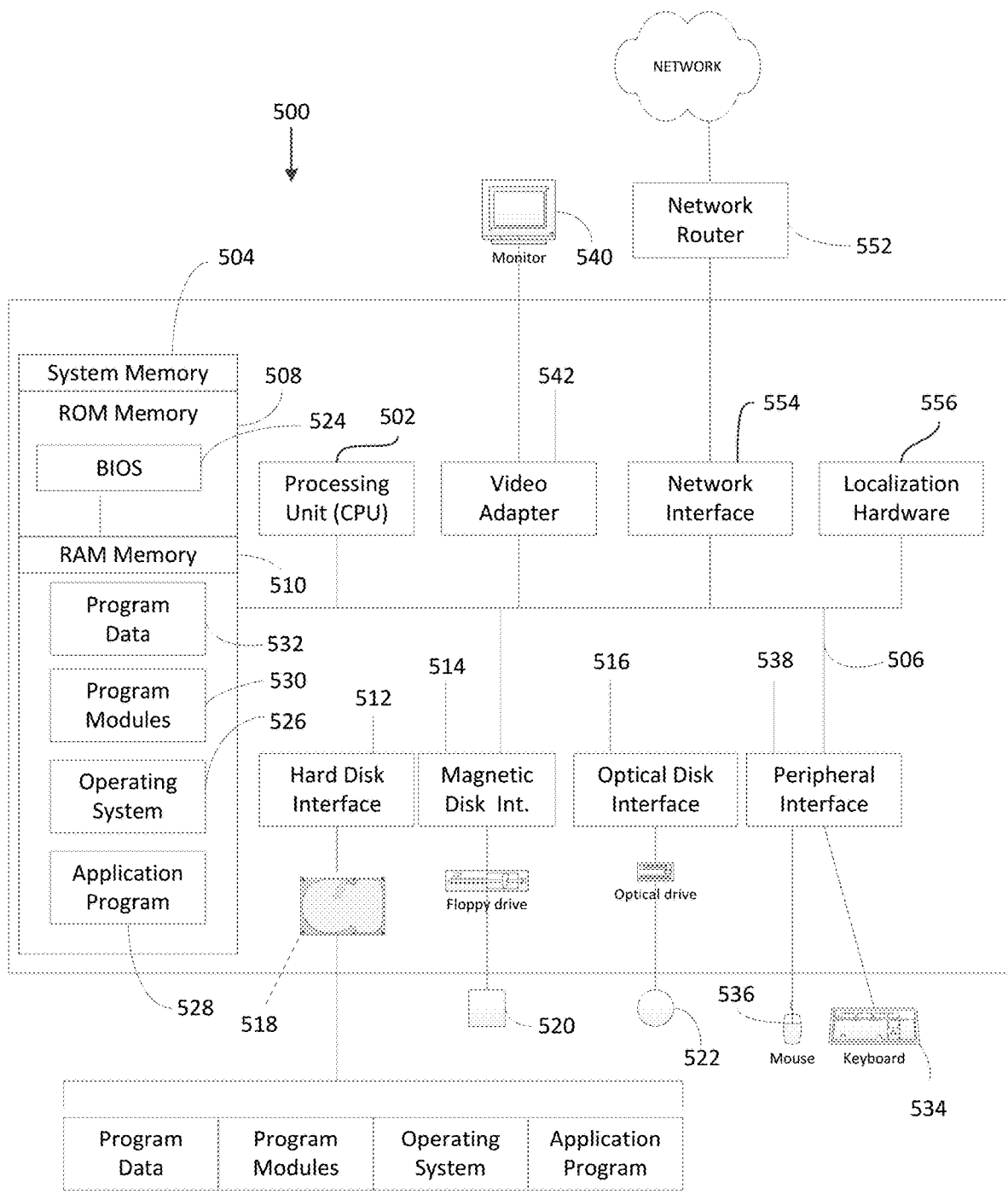
FIG. 5 is a diagrammatic view of an example user computing environment.

FIG. 5 is a diagrammatic view of an illustrative computing system that includes a computing system environment 500, such as a desktop computer, laptop, smartphone, tablet, or any other such device having the ability to execute instructions, such as those stored within a non-transient, computer-readable medium. Furthermore, while described and illustrated in the context of a single computing system 500, those skilled in the art will also appreciate that the various tasks described hereinafter may be practiced in a distributed environment having multiple computing systems 500 linked via a local or wide-area network in which the executable instructions may be associated with and/or executed by one or more of multiple computing systems 500.

Computing system environment 500 may include at least one processing unit 502 and at least one memory 504, which may be linked via a bus 506. Depending on the exact configuration and type of computing system environment, memory 504 may be volatile (such as RAM 510), nonvolatile (such as ROM 508, flash memory, etc.) or some combination of the two. Computing system environment 500 may have additional features and/or functionality. For example, computing system environment 500 may also include additional storage (removable and/or non-removable) including, but not limited to, magnetic or optical disks, tape drives and/or flash drives. Such additional memory devices may be made accessible to the computing system environment 500 by means of, for example, a hard disk drive interface 512, a magnetic disk drive interface 514, and/or an optical disk drive interface 516. As will be understood, these devices, which would be linked to the system bus 506, respectively, allow for reading from and writing to a hard disk 518, reading from or writing to a removable magnetic disk 520, and/or for reading from or writing to a removable optical disk 522, such as a CD/DVD ROM or other optical media. The drive interfaces and their associated computer-readable media allow for the nonvolatile storage of computer readable instructions, data structures, program modules and other data for the computing system environment 500. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 500.

A number of program modules may be stored in one or more of the memory/media devices. For example, a basic input/output system (BIOS) 524, containing the basic routines that help to transfer information between elements within the computing system environment 500, such as during start-up, may be stored in ROM 508. Similarly, RAM 510, hard drive 518, and/or peripheral memory devices may be used to store computer executable instructions comprising an operating system 526, one or more applications programs 528 (such as one or more applications that execute the methods and processes of this disclosure), other program modules 530, and/or program data 532. Still further, computer-executable instructions may be downloaded to the computing environment 500 as needed, for example, via a network connection.

An end-user may enter commands and information into the computing system environment 500 through input devices such as a keyboard 534 and/or a pointing device 536. While not illustrated, other input devices may include a microphone, a joystick, a game pad, a scanner, etc. These and other input devices would typically be connected to the processing unit 502 by means of a peripheral interface 538 which, in turn, would be coupled to bus 506. Input devices may be directly or indirectly connected to processor 502 via interfaces such as, for example, a parallel port, game port, firewire, or a universal serial bus (USB). To view information from the computing system environment 500, a monitor 540 or other type of display device may also be connected to bus 506 via an interface, such as via video adapter 542. In addition to the monitor 540, the computing system environment 500 may also include other peripheral output devices, not shown, such as speakers and printers.

The computing system environment 500 may also utilize logical connections to one or more computing system environments. Communications between the computing system environment 500 and the remote computing system environment may be exchanged via a further processing device, such a network router 552, that is responsible for network routing. Communications with the network router 552 may be performed via a network interface component 554. Thus, within such a networked environment, e.g., the Internet, World Wide Web, LAN, or other like type of wired or wireless network, it will be appreciated that program modules depicted relative to the computing system environment 500, or portions thereof, may be stored in the memory storage device(s) of the computing system environment 500.

The computing system environment 500 may also include localization hardware 556 for determining a location of the computing system environment 500. In embodiments, the localization hardware 556 may include, for example only, a GPS antenna, an RFID chip or reader, a WiFi antenna, or other computing hardware that may be used to capture or transmit signals that may be used to determine the location of the computing system environment 500.

In embodiments, the computing system environment 500, or portions thereof, may comprise the repository of product listings 102, the repository of inventory information 104, the repository of user information 106, the result ranking system 108, and/or one or more user computing devices 120.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for returning a results page responsive to a user search query, the method comprising:
   receiving, via a user device, a query from a user;
   determining, responsive to the query, a set of relevant products;
   deriving a characteristic of the user from at least one of the query or the user device;
   calculating, based on the derived characteristic and on one or more available fulfillment channels, a respective fulfillment score for each of the relevant products;
   ranking the relevant products according to the calculated fulfillment scores; and
   presenting, on the user device, a search result comprising a list of the relevant products, ordered according to the ranking.

2. The method of claim 1, wherein calculating the respective fulfillment score for each of the relevant products comprises, for each relevant product:
   assigning a respective value to each of the one or more available fulfillment channels associated with the relevant product based on the derived characteristic; and
   combining the respective values, the combined values comprising the fulfillment score.

3. The method of claim 1, wherein the one or more fulfillment channels respective of the relevant products comprise in-store pickup, ship to store, deliver from store, ship to home, and unavailable.

4. The method of claim 1, wherein the derived characteristic comprises a location of the user at a time of the query, and wherein ranking the relevant products further comprises:
   adjusting the calculated fulfillment scores for the relevant products according to respective inventories of the relevant products near the location.

5. The method of claim 1, wherein the derived characteristic comprises a preferred fulfillment channel associated with the user, and wherein ranking the relevant products comprises:
   adjusting the calculated fulfillment scores for the relevant products according to respective inventories of the relevant products for the preferred fulfillment channel.

6. The method of claim 5, wherein the deriving of the characteristic of the user comprises:
   retrieving a purchase history of a user; and
   determining the preferred fulfillment channel as a fulfillment channel utilized for a majority of the purchase history.

7. The method of claim 1, wherein the derived characteristic comprises an electronic device type of the user device, and wherein calculating the respective fulfillment score for each of the relevant products comprises, for each relevant product:
   assigning values to one or more fulfillment channels associated with the relevant products according to the electronic device type; and
   combining the respective values, the combined values comprising the fulfillment score.

8. The method of claim 1, wherein the determining the set of relevant products comprises:
   determining a relevance score of each of a plurality of product listings based on a degree of similarity of text of the query to text associated with each of the plurality of product listings; and
   determining the set of relevant products as each of the plurality of product listings having a respective relevance score that exceeds a threshold value.

9. A system for returning a results page responsive to a user search query, the system comprising:
   a processor; and
   a non-transitory, computer-readable memory storing instructions that, when executed by the processor, cause the system to perform a method comprising:
   receiving, via a user device, a query from a user;
   determining, responsive to the query, a set of relevant products;
   deriving a characteristic of the user from at least one of the query or the user device;
   calculating, based on the derived characteristic and on one or more available fulfillment channels, a respective fulfillment score for each of the relevant products;
   ranking the relevant products according to the calculated relevance scores; and
   presenting, on the user device, a search result comprising a list of the relevant products, ordered according to the ranking.

10. The system of claim 9, wherein calculating the respective fulfillment score for each of the relevant products comprises, for each relevant product:
   assigning a respective value to each of the one or more available fulfillment channels associated with the relevant product based on the derived characteristic; and
   combining the respective values, the combined values comprising the fulfillment score.

11. The system of claim 9, wherein the derived characteristic comprises a location of the user at a time of the query, and wherein ranking the relevant products further comprises:
adjusting the calculated relevance scores for the relevant products according to respective inventories of the relevant products near the location.

12. The system of claim 9, wherein the derived characteristic comprises a preferred fulfillment channel associated with the user, and wherein ranking the relevant products comprises:
adjusting the calculated relevance scores for the relevant products according to respective inventories of the relevant products for the preferred fulfillment channel.

13. The system of claim 9, wherein the derived characteristic comprises an electronic device type of the user, and wherein calculating the respective fulfillment score for each of the relevant products comprises, for each relevant product:
assigning values to one or more fulfillment channels associated with the relevant products according to the electronic device type; and
combining the respective values, the combined values comprising the fulfillment score.

14. The system of claim 9, wherein the determining the set of relevant products comprises:
determining a relevance score of each of a plurality of product listings based on a degree of similarity of text of the query to text associated with each of the plurality of product listings; and
determining the set of relevant products as each of the plurality of product listings having a respective relevance score that exceeds a threshold value.

15. The system of claim 9, wherein determining the set of relevant products comprises:
receiving a predetermined threshold value for relevance; and
determining the set of relevant products as each of a plurality of product listings having a respective relevance score that exceeds the predetermined threshold value.

16. A server-implemented method for generating a results page responsive to a query from a user device, the method comprising:
executing a search of a plurality of product listings responsive to the query;
determining, based on the search, a set of relevant products from the plurality of product listings based on a similarity of the user query to the respective product listings;
deriving a characteristic of a user associated with the user device from at least one of the query or the user device;
calculating, based on the derived characteristic and on one or more available fulfillment channels, a respective fulfillment score for each of the relevant products;
ranking the relevant products according to the calculated relevance scores; and
presenting, on the user device, a search result comprising a list of the relevant products, ordered according to the ranking.

17. The method of claim 16, wherein calculating the respective fulfillment score for each of the relevant products comprises, for each relevant product:
assigning a respective value to each of the one or more available fulfillment channels associated with the relevant product based on the derived characteristic; and
combining the respective values, the combined values comprising the fulfillment score.

18. The method of claim 16, wherein the derived characteristic comprises a location of the user at a time of the query, and wherein ranking the relevant products further comprises:
adjusting the calculated relevance scores for the relevant products according to respective inventories of the relevant products near the location.

19. The method of claim 16, wherein the derived characteristic comprises a preferred fulfillment channel associated with the user, and wherein ranking the relevant products comprises:
adjusting the calculated relevance scores for the relevant products according to respective inventories of the relevant products for the preferred fulfillment channel.

20. The method of claim 16, wherein the derived characteristic comprises an electronic device type of the user device, and wherein calculating the respective fulfillment score for each of the relevant products comprises, for each relevant product:
assigning values to one or more fulfillment channels associated with the relevant products according to the electronic device type; and
combining the respective values, the combined values comprising the fulfillment score.

* * * * *